(12) United States Patent
Heikenfeld

(10) Patent No.: US 12,487,204 B2
(45) Date of Patent: Dec. 2, 2025

(54) SWEAT SENSING DEVICES WITH ELECTROMAGNETICALLY SHIELDED SENSORS, INTERCONNECTS, AND ELECTRONICS

(71) Applicant: University Of Cincinnati, Cincinnati, OH (US)

(72) Inventor: Jason Charles Heikenfeld, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 1511 days.

(21) Appl. No.: 15/771,523

(22) PCT Filed: Oct. 28, 2016

(86) PCT No.: PCT/US2016/059392
§ 371 (c)(1),
(2) Date: Apr. 27, 2018

(87) PCT Pub. No.: WO2017/075402
PCT Pub. Date: May 4, 2017

(65) Prior Publication Data
US 2018/0340903 A1 Nov. 29, 2018

Related U.S. Application Data

(60) Provisional application No. 62/248,356, filed on Oct. 30, 2015.

(51) Int. Cl.
*G01N 27/06* (2006.01)
*A61B 5/00* (2006.01)
(Continued)

(52) U.S. Cl.
CPC .............. *G01N 27/06* (2013.01); *A61B 5/00* (2013.01); *A61B 5/05* (2013.01); *A61B 5/053* (2013.01);
(Continued)

(58) Field of Classification Search
None
See application file for complete search history.

(56) References Cited

U.S. PATENT DOCUMENTS

| 4,190,060 A | 2/1980 | Greenleaf et al. |
| 4,542,751 A | 9/1985 | Webster et al. |

(Continued)

FOREIGN PATENT DOCUMENTS

| CA | 2869469 A1 | 10/2013 |
| CN | 1874720 A | 12/2006 |

(Continued)

OTHER PUBLICATIONS

Agwuh, Kenneth N., et al., "Pharmacokinetics and pharmacodynamics of the tetracyclines including glycylcyclines," Journal of Antimicrobial Chemotherapy, 2006, vol. 58, pp. 256-265, Advance Access Publication (10 pages).

(Continued)

*Primary Examiner* — Lyle Alexander
*Assistant Examiner* — Dwan A Gerido
(74) *Attorney, Agent, or Firm* — Wood Herron & Evans LLP

(57) ABSTRACT

A wearable sweat sensing device configured to be placed on a wearer's skin includes a sensor component, including at least one analyte-specific sensor for measuring a target analyte in sweat, and at least one electromagnetic shield to protect at least a portion of the sensor component from electromagnetic interference. The at least one electromagnetic shield may include a first electromagnetic shield for (Continued)

protecting the sensor component from electromagnetic interference originating outside the wearer's body and a second electromagnetic shield for protecting the sensor component from electromagnetic interference originating from the wearer's body or propagating through the wearer's body.

19 Claims, 2 Drawing Sheets

(51) Int. Cl.
*A61B 5/05* (2021.01)
*A61B 5/053* (2021.01)
*A61B 5/145* (2006.01)
*G01N 33/50* (2006.01)

(52) U.S. Cl.
CPC ........ *A61B 5/14517* (2013.01); *A61B 5/6833* (2013.01); *G01N 33/50* (2013.01); *A61B 2562/182* (2013.01)

(56) References Cited

U.S. PATENT DOCUMENTS

| | | | |
|---|---|---|---|
| 4,756,314 A | 7/1988 | Eckenhoff et al. |
| 4,820,263 A | 4/1989 | Spevak et al. |
| 5,036,861 A | 8/1991 | Sembrowich et al. |
| 5,050,604 A | 9/1991 | Reshef et al. |
| 5,140,985 A | 8/1992 | Schroeder et al. |
| 5,246,003 A | 9/1993 | DeLonzor |
| 5,438,984 A | 8/1995 | Schoendorfer |
| 5,556,789 A | 9/1996 | Goerlach-Graw et al. |
| 5,814,599 A | 9/1998 | Mitragotri et al. |
| 5,944,662 A | 8/1999 | Schoendorfer |
| 6,198,953 B1 | 3/2001 | Webster et al. |
| 6,256,533 B1 | 7/2001 | Yuzhakov et al. |
| 6,269,265 B1 | 7/2001 | Anderson |
| 6,299,578 B1 | 10/2001 | Kurnik et al. |
| 6,592,529 B2 | 7/2003 | Marett |
| 6,666,821 B2 | 12/2003 | Keimel |
| 7,190,986 B1 | 3/2007 | Hannula et al. |
| 7,219,534 B2 | 5/2007 | Campbell |
| 7,378,054 B2 | 5/2008 | Karmali |
| 7,383,072 B2 | 6/2008 | Edmonson et al. |
| 7,384,396 B2 | 6/2008 | Samuels et al. |
| 7,749,445 B2 | 7/2010 | Masters |
| 7,813,780 B2 | 10/2010 | Shah et al. |
| 7,842,234 B2 | 11/2010 | Lauks et al. |
| 7,959,791 B2 | 6/2011 | Kjaer et al. |
| 8,125,539 B2 | 2/2012 | Takashima |
| 8,128,889 B2 | 3/2012 | Fujimoto et al. |
| 8,252,248 B2 | 8/2012 | Kramer |
| 8,391,946 B2 | 3/2013 | Sugenoya et al. |
| 8,565,850 B2 | 10/2013 | Martinsen et al. |
| 8,593,287 B2 | 11/2013 | Hayter et al. |
| 8,617,067 B2 | 12/2013 | Jain et al. |
| 9,133,024 B2 | 9/2015 | Phan et al. |
| 2002/0091312 A1 | 7/2002 | Berner et al. |
| 2003/0135100 A1 | 7/2003 | Kim et al. |
| 2003/0191376 A1 | 10/2003 | Samuels et al. |
| 2003/0201194 A1 | 10/2003 | Heller et al. |
| 2004/0249310 A1 | 12/2004 | Shartle et al. |
| 2004/0267189 A1 | 12/2004 | Mavor et al. |
| 2005/0069925 A1 | 3/2005 | Ford et al. |
| 2005/0096520 A1 | 5/2005 | Maekawa et al. |
| 2005/0106713 A1 | 5/2005 | Phan et al. |
| 2005/0177035 A1 | 8/2005 | Botvinick et al. |
| 2005/0192528 A1 | 9/2005 | Tapper |
| 2005/0197554 A1 | 9/2005 | Polcha |
| 2006/0004271 A1 | 1/2006 | Peyser et al. |
| 2006/0062852 A1 | 3/2006 | Holmes |
| 2006/0127964 A1 | 6/2006 | Ford et al. |
| 2006/0253011 A1 | 11/2006 | Edmonson et al. |
| 2006/0254341 A1 | 11/2006 | Campbell |
| 2007/0027383 A1 | 2/2007 | Peyser et al. |
| 2007/0032731 A1 | 2/2007 | Lovejoy et al. |
| 2007/0179371 A1 | 8/2007 | Peyser et al. |
| 2008/0015494 A1 | 1/2008 | Santini et al. |
| 2008/0045816 A1 | 2/2008 | Jang et al. |
| 2008/0154179 A1 | 6/2008 | Cantor et al. |
| 2008/0286349 A1 | 11/2008 | Nomoto et al. |
| 2008/0306362 A1* | 12/2008 | Davis .................. A61B 5/4869 600/307 |
| 2009/0076345 A1 | 3/2009 | Manicka et al. |
| 2009/0204008 A1 | 8/2009 | Beilin |
| 2009/0270704 A1 | 10/2009 | Peyser et al. |
| 2010/0030167 A1* | 2/2010 | Thirstrup ................ A61F 13/42 604/318 |
| 2010/0044224 A1 | 2/2010 | Kataky |
| 2010/0063372 A1 | 3/2010 | Potts et al. |
| 2010/0130843 A1 | 5/2010 | Caceres Galvez et al. |
| 2010/0132485 A1 | 6/2010 | Erez et al. |
| 2010/0179403 A1 | 7/2010 | Martinsen et al. |
| 2010/0198521 A1 | 8/2010 | Haick |
| 2010/0234712 A1 | 9/2010 | Sugenoya et al. |
| 2011/0079521 A1 | 4/2011 | Revol-Cavalier |
| 2011/0118656 A1 | 5/2011 | Eckhoff et al. |
| 2011/0178380 A1 | 7/2011 | Chowdhury |
| 2011/0196283 A1 | 8/2011 | Imran et al. |
| 2011/0208458 A1 | 8/2011 | Pinter et al. |
| 2011/0275918 A1 | 11/2011 | Yamashita et al. |
| 2012/0004570 A1 | 1/2012 | Shimizu et al. |
| 2012/0028283 A1 | 2/2012 | Hoss et al. |
| 2012/0123220 A1 | 5/2012 | Iyer et al. |
| 2012/0165626 A1 | 6/2012 | Irina et al. |
| 2012/0209226 A1 | 8/2012 | Simmons et al. |
| 2012/0229661 A1 | 9/2012 | Sekiguchi et al. |
| 2012/0271125 A1 | 10/2012 | Bernstein et al. |
| 2012/0277697 A1 | 11/2012 | Haghgooie et al. |
| 2012/0285829 A1 | 11/2012 | Mount et al. |
| 2012/0317430 A1 | 12/2012 | Rahman et al. |
| 2012/0323097 A9 | 12/2012 | Chowdhury |
| 2013/0006079 A1 | 1/2013 | Feldman et al. |
| 2013/0010108 A1 | 1/2013 | Hashizume et al. |
| 2013/0013028 A1 | 1/2013 | Kriksunov et al. |
| 2013/0053668 A1 | 2/2013 | Lin |
| 2013/0079605 A1 | 3/2013 | Bandaru et al. |
| 2013/0099937 A1 | 4/2013 | Azimi |
| 2013/0108667 A1 | 5/2013 | Soikum et al. |
| 2013/0123595 A1 | 5/2013 | Currie et al. |
| 2013/0183399 A1 | 7/2013 | Blow et al. |
| 2013/0197333 A1 | 8/2013 | Petisce |
| 2013/0245388 A1 | 9/2013 | Rafferty et al. |
| 2013/0306491 A1 | 11/2013 | Briman et al. |
| 2013/0317333 A1 | 11/2013 | Yang et al. |
| 2014/0012114 A1 | 1/2014 | Zevenbergen et al. |
| 2014/0025000 A1 | 1/2014 | Currie et al. |
| 2014/0066726 A1 | 3/2014 | Costello |
| 2014/0163338 A1 | 6/2014 | Roesicke |
| 2014/0206977 A1 | 7/2014 | Bahney et al. |
| 2014/0257064 A1 | 9/2014 | Einck et al. |
| 2014/0275862 A1 | 9/2014 | Kennedy |
| 2014/0276220 A1 | 9/2014 | Briscoe et al. |
| 2014/0343371 A1 | 11/2014 | Sowers, II et al. |
| 2015/0057515 A1 | 2/2015 | Hagen et al. |
| 2015/0112164 A1 | 4/2015 | Heikenfeld et al. |
| 2015/0112165 A1 | 4/2015 | Heikenfeld |
| 2016/0058354 A1 | 3/2016 | Phan et al. |
| 2016/0066828 A1 | 3/2016 | Phan et al. |
| 2016/0157768 A1 | 6/2016 | Braig et al. |

FOREIGN PATENT DOCUMENTS

| | | |
|---|---|---|
| CN | 1969184 A | 5/2007 |
| CN | 1984716 A | 6/2007 |
| CN | 101380240 A | 3/2009 |
| CN | 101489470 A | 7/2009 |
| CN | 201508360 U | 6/2010 |
| EP | 0282349 A2 | 9/1988 |
| EP | 0453283 A1 | 10/1991 |
| EP | 0634215 A1 | 1/1995 |
| EP | 1500937 A1 | 1/2005 |
| EP | 1637889 A1 | 3/2006 |
| EP | 2551784 A1 | 1/2013 |

(56) References Cited

FOREIGN PATENT DOCUMENTS

| | | | |
|---|---|---|---|
| JP | H07-77525 A | 3/1995 | |
| JP | H08-504513 A | 5/1996 | |
| JP | 2007503958 A | 3/2007 | |
| JP | 2007532260 A | 11/2007 | |
| JP | 2008505330 A | 2/2008 | |
| JP | 200963597 A | 3/2009 | |
| JP | 2009118420 A | 5/2009 | |
| WO | 9011519 A1 | 10/1990 | |
| WO | 9414062 A1 | 6/1994 | |
| WO | 0014535 A1 | 3/2000 | |
| WO | 0188525 A1 | 11/2001 | |
| WO | 2006133101 A2 | 12/2006 | |
| WO | 2007097754 A1 | 8/2007 | |
| WO | 2007146047 A1 | 12/2007 | |
| WO | 2008083687 A1 | 7/2008 | |
| WO | 2008095940 A1 | 8/2008 | |
| WO | 2009004001 A1 | 1/2009 | |
| WO | 2009052321 A2 | 4/2009 | |
| WO | 2010017578 A1 | 2/2010 | |
| WO | 2010045247 A1 | 4/2010 | |
| WO | 2011117952 A1 | 9/2011 | |
| WO | WO-2013152087 A2 * | 10/2013 | ............ B01L 3/5023 |
| WO | 2013181436 A1 | 12/2013 | |
| WO | 2014001577 A1 | 1/2014 | |
| WO | 2014025430 A2 | 2/2014 | |
| WO | 2015120439 A1 | 8/2015 | |
| WO | 2015184072 A1 | 12/2015 | |
| WO | 2015184097 A2 | 12/2015 | |
| WO | 2016049019 A1 | 3/2016 | |
| WO | 2016061362 A2 | 4/2016 | |
| WO | 2016090189 A1 | 6/2016 | |
| WO | 2016130905 A1 | 8/2016 | |
| WO | 2016138087 A1 | 9/2016 | |
| WO | 2017019573 A1 | 2/2017 | |
| WO | 2017019602 A1 | 2/2017 | |
| WO | 2017070640 A1 | 4/2017 | |

OTHER PUBLICATIONS

Argatroban Injection, Package Insert for Argatroban Injection, "Highlights of Prescribing Information," Research Triangle Park, NC, GlaxoSmithKline, 2012 (22 pages).
Balant-Gorgia, Androniki E., et al., "Clinical Pharmacokinetics of Clompipramine," Clin. Pharmacokinet., vol. 20 (6), 1991, pp. 447-462 (16 pages).
Baxter, Roger, et al., "Comparison of Bactericidal Activity of Five Antibiotics against *Staphylococcus aureus*," Oxford Journals, The Journal of Infectious Diseases, vol. 161, No. 5, May 1990, pp. 1023-1025, Oxford University Press (4 pages).
Bertrand, Julie, et al., "Influence of pharmacogenetics on indinavir dispostion and short-term response in HIV patients initiating HAART," Eur J Clin Pharmacol., Jul. 22, 2010, vol. 65(7), pp. 667-678 (17 pages).
Bockbrader, Howard N., et al., "Clinical Pharmacokinetics of Pregabalin in Healthy Volunteers," Journal of Clinical Pharmacology, 2010, vol. 50, pp. 941-950 (10 pages).
Buch, A.B., et al., "A Study of Pharmacokinetic Interaction Between Buspirone and Alprazolam at Steady State," J Clin Pharmacol, 1993, vol. 33, pp. 1104-1109 (6 pages).
Chinese Patent Office, English translation of Office Action issued in Chinese Application No. 201480067960.8, dated Dec. 11, 2018 , 3 pages.
European Patent Office, Extended European Search Report issued in European Application No. 15800539.7, dated Aug. 17, 2018 (6 pages).
European Patent Office, Extended European Search Report issued in European Application No. 16753129.2, dated Jun. 15, 2018 (8 pages).
European Patent Office, extended European Search Report issued in European Patent Application No. 16831190.0, mailed on Jan. 30, 2019 (8 pages).
European Patent Office, Extended Search Report issued for European Application No. 15800043.0-1115 mailed Apr. 16, 2018, 11 pages.
European Patent Office, Supplementary European Search Report issued in corresponding European Application No. EP 16749949, dated Jun. 15, 2018 (7 pages).
European Supplementary Search Report in European Application No. EP 16845111, dated Mar. 14, 2019, 9 pgs.
Fonseca, Walter, et al., "Comparing Pharmacokinetics of Amoxicillin Given Twice or Three Times per Day to Children Older than 3 Months with Pneumonia," Antimicrobial Agents and Chemotherapy, Mar. 2003, vol. 47, No. 3, pp. 997-1001, American Society for Microbiology (5 pages).
Friedrich, Lawrance V., et al., "Aztreonam Pharmacokinetics in Burn Patients," Antimicrobial Agents and Chemotherapy, Jan. 1991, vol. 35, No. 1, pp. 57-61, American Society for Microbiology (5 pages).
Garcia, David A., et al., "Parenteral Anticoagulants: Antithrombotic Therapy and Prevention of Thrombosis, 9th ed: American College of Chest Physicians Evidence-Based Clinical Practice Guidelines," Chest, 2012, vol. 141/2 (Supplement), pp. e24S-e43S (20 pages).
Geller, David E., et al., :Pharmacokinetics and Bioavailability of Aerosolized Tobramycin in Cystic Fibrosis, Chest, vol. 122, No. 1, Jul. 2002, pp. 219-226 (8 pages).
Glazer, William M., et al., "The determination of the steady-state pharmacokinetic profile of fluphenazine decanoate by gas chromatography/mass spectrometry detection," Schizophrenia Research, 1992, vol. 8, pp. 111-117, Elsevier Science Publishers B.V. (7 pages).
Goodwin, Megan L., et al., "Antifungal serum concentration monitoring: an update," Journal of Antimicrobial Chemotherapy, 2008, vol. 61, pp. 17-25, Advance Access publicaiton Nov. 12, 2007 (9 pages).
Hsu, Ann, et al., "Multiple-Dose Pharmacokinetics of Ritonavir in Human Immunodeficiency Virus-Infected Subjects," Antimicrobial Agents and Chemotherapy, May 1997, Vo. 41, No. 5, pp. 898-905, American Society for Microbiology (8 pages).
Hyland, R., et al., "Identification of the Cytochrome P450 Enzymes Involved in the N-Oxidation of Voriconazole," Drug Metabolism and Disposition, Jan. 2003, vol. 31, No. 5, pp. 540-547, The American Society for Pharmacology and Experimental Therapeutics (8 pages).
Kappelhoff, Bregt S., et al., "Pharmacokinetics of Nevirapine: Once-Daily Versus Twice-Daily Dosing in the 2NN Study," HIV Clinical Trials, Sep. 2005, vol. 6(5), pp. 254-261, Thomas Land Publishers, Inc. (9 pages).
La Porte, C.J.L., et al., "Pharmacokinetics of Adjusted-Dose Lopinavir-Ritonavir Combined with Rifampin in Healthy Volunteers," Antimicrobial Agents and Chemotherapy, May 2004, vol. 48, No. 5, pp. 1553-1560, American Society for Microbiology (8 pages).
Lacy, Melinda K., et al., "Comparison of bactericidal activity after multidose administration of clarithromycin, azithromycin, and cefuroxime axetil aginst *Streptococcus pneumoniae*," International Journal of Antimicrobial Agents 10, 1998, pp. 279-283, Elsevier (5 pages).
Lai, Allen A., et al., "Time-course of interaction between carbamazepine and clonazepam in normal man," Clin. Pharmacol. Ther., Sep. 1978, vol. 24, pp. 316-323, The C.V. Mosby Co. (8 pages).
Marshall, William F., et al., "The Cephalosporins," Symposium on Antimicrobial Agents—Part V, Mayo Clin Proc, 1999, vol. 74, pp. 187-195 (9 pages).
McIlleron, Helen, et al., "Determinants of Rifampin, Isoniazid, Pyrazinamide, and Ethambutol Pharmacokinetics in a Cohort of Tuberculosis Patients," Antimicrobial Agents and Chemotherapy, Apr. 2006, vol. 50, No. 4, pp. 1170-1177, American Society for Microbiology (8 pages).
Medscape, "Drug, OTCs and Herbals | Medscape Reference," http://www.reference.medscapte.com/drugs, Accessed Mar. 2013 and Apr. 3, 2017 (1 page).
Mimaki, Takashi, "Clinical Pharmacology and Therapeutic Drug Monitoring of Zonisamide," Therapeutic Drug Monitoring, Dec. 1998, vol. 20(6), pp. 593-597, Lippincott Williams & Wilkins, Inc. (9 pages).

(56) References Cited

OTHER PUBLICATIONS

Molina, J-M., et al., "Pharmacokinetics of emtricitabine, didanosine andefavirenz administered once-daily for the treatment of HIV-infected adults (Pharmacokinetic substudy of the ANRS 091 trial)," HIV Medicine (2004), vol. 5, pp. 99-104, 2004 British HIV Association (6 pages).
Morse, Gene D., et al., "Multiple-Dose Pharmacokinetics of Delavirdine Mesylate and Didanosine in HIV-Infected Patients," Clin Drug Invest, 2003, pp. 323-328, vol. 23 (5), Adis Data Information BV (6 pages).
Munne P. International Programme on Chemical Safety Poisons Information Monograph 181, "Pharmacology and Toxicology," Published Apr. 1990, available at: http://www.inchem.org/documents/pims/pharm/pim181.htm#PartTitle:7.%20%20PHARMACOLOGY%20AND%20TOXICOLOGY, Accessed Oct. 2, 2009, pp 14-18 (5 pages).
Nauta, Ernst H., et al., "Dicloxacillin and cloxacillin: Pharmacokinetics in healthy and hemodialysis subjects," Clinical Pharmacology and Therapeutics, vol. 20, No. 1, Feb. 13, 1976, pp. 98-108 (11 pages).
Ochs, Hermann R., et al., "Digitoxin Accumulation," Br. J. clin. Pharmac. (1982), vol. 14, pp. 225-229. The Macmillan Press Ltd 1982 (5 pages).
Ordonez Gallego, A., et al., "Oxycodone: a pharmacological and clinical review," Clin Transl Oncol, 2007, vol. 9, pp. 298-307 (10 pages).
Pippenger, C.E., et al., "Principles of Therapeutic Drug Monitoring," In: Wong Shy, ed. Therapeutic Drug Monitoring and Toxicology by Liquid Chromatography. Boca Raton, FL: CRC Press, 1985, pp. 11-36 (26 pages).
Purkins, L., et al., "Pharmacokinetics and Safety of Voriconazole following Intravenous-to Oral-Dose Escalation Regimens," Antimicrobial Agents and Chemotherapy, Aug. 2002, vol. 46, No. 8, pp. 2546-2553, American Society for Microbiology (8 pages).
Purkins, Lynn, et al., "The pharmacokinetics and safety of intravenous voriconazole—a novel wide-spectrum antifungal agent," Br J Clin Pharmacol, 2003, vol. 56, pp. 2-9, Blackwell Publishing Ltd (8 pages).
Ratjen, F., et al., "Pharmacokinetics of inhaled colistin in patients with cystic fibrosis," Journal of Antimicrobial Chemotherapy, 2006, vol. 57, pp. 306-311 (6 pages).
Remmel, Rory P., et al., "Simultaneous Assay of Felbamate plus Carbamazepine, Phenytoin, and Their Metabolites by Liquid Chromatography with Mobile Phase Optimization," Therapeutic Drug Monitoring, 1990, vol. 12, pp. 90-96, Raven Press, Ltd., New York (7 pages).
Rosenfeld, W.E., et al., "Comparison of the Steady-State Pharmacokinetics of Topiramate and Valproate in Patients with Epilepsy During Monotherapy and Concomitant Therapy," Epilepsia, 1997, vol. 38(3), pp. 324-333, Lippincott-Raven Publishers, Philadelphia (10 pages).
Ruslami, Rovina, et al., "Pharmacokinetics and Tolerability of a Higher Rifampin Dose versus the Standard Dose in Pulmonary Tuberculosis Patients," Antimicrobial Agents and Chemotherapy, Jul. 2007, vol. 51, No. 7, pp. 2546-2551, American Society for Microbiology (6 pages).
Rythmol, Package Insert for Rythmol, "Highlights of Prescribing Information," Reliant Pharmaceuticals Inc., 2004 (24 pages).
Sadler, Brian M., et al., "Pharmacokinetic and Pharmacodynamic Study of the Human Immunodeficiency Virus Protease Inhibitor Amprenavir after Multiple Oral Dosing," Antimicrobial Agents and Chemotherapy, Jan. 2001, vol. 45, No. 1, pp. 30-37, American Society for Microbiology (8 pages).
Silverstein, Jeffrey H., et al., "An Analysis of the Duration of Fentanyl and Its Metabolites in Urine and Saliva," Anesth Analg, 1993, vol. 76:6, pp. 618-621, The International Anesthesia Research Society (4 pages).
Sobue, Satoshi, et al., "Pharmacokinetics of fosfluconzaole and fluconazole following multiple intravenous administration of fosfluconazole in healthy male volunteers," British Journal of Clinical Pharmacology, 2004, vol. 58:1, pp. 20-25, Blackwell Publishing Ltd. (6 pages).
Song et al., Aptamer-based biosensors, Trac Trends in Analytical Chemistry, vol. 27, No. 2, Dec. 23, 2007, pp. 108-117.
Ti, Teow-Yee, et al., "Disposition of Intravenous Metronidazole in Asian Surgical Patients," Antimicrobial Agents and Chemotherapy, Oct. 1996, vol. 40, No. 10, pp. 2248-2251, American Society for Microbiology (4 pages).
Viracept, Package Insert for Viracept, "Highlights of Prescribing Information," Agouron Pharmaceuticals, 2008 (27 pages).
Supplementary European Search Report in European Patent Application No. 16860910.5, 4 pgs.
Von Hentig, Nils, et al., "Pharmacokinetics of Saquinavir, Atazanavir, and Ritonavir in a Twice-Daily Boosted Double-Protease Inhibitor Regimen," Antimicrobial Agents and Chemotherapy, Apr. 2007, vol. 51, No. 4, pp. 1431-1439, American Society for Microbiology (9 pages).
Wilens, Timothy E., et al., "Fluoxetine Pharmacokinetics in Pediatric Patients," Journal of Clinical Psychopharmacology, 2002, vol. 22, No. 6, pp. 568-575, Lippincott Williams & Wilkins, Inc. (8 pages).
Wong, Steven H.Y., "Therapeutic Drug Monitoring and Toxicology by Liquid Chromatography," Chromatographic Science Series, 1985, vol. 32, Chapter 2 "Principles of Therapeutic Drug Monitoring" by C.E. Pippenger, Marcel Dekker, Inc., New York and Basel (34 pages).
Yamamoto, Takatsugu, et al., "Pharmacokinetic Characteristics of Minocycline in Debilitated Elderly Patients," American Journal of Therapeutics, 1999, vol. 6, pp. 157-160 (4 pages).
Zyprexa Relprevv, Package Insert for Zyprexa Relprevv, "Highlights of Prescribing Information," Eli Lilly and Company, 2008 (27 pages).
International Searching Authority, Search Report and Written Opinion issued in corresponding International Application No. PCT/US2016/059392, mailed on Feb. 15, 2017 (12 pages).
International Searching Authority, Search Report and Written Opinion issued in corresponding International Application No. PCT/US2014/061098 issued Dec. 12, 2014, 13 pages.
International Searching Authority, Invitation to Pay Additional Search Fees and, Where Applicable, Protest Fee, and Communication Relating to the Results of the Partial International Search, issued in International Application No. PCT/US2014/061083 dated Dec. 15, 2014, 6 pages.
International Searching Authority, Search Report and Written Opinion issued in International Application No. PCT/US2014/061083 mailed Mar. 31, 2015, 18 pages.
International Searching Authority, Search Report and Written Opinion issued in International Application No. PCT/US2015/032830 mailed Aug. 14, 2015, 9 pages.
International Searching Authority, Search Report and Written Opinion issued in International Application No. PCT/US2015/032843 mailed Oct. 26, 2015, 11 pages.
International Searching Authority, Search Report and Written Opinion issued in International Application No. PCT/US2015/032866 issued Nov. 19, 2015, 12 pages.
International Searching Authority, Search Report and Written Opinion issued in International Application No. PCT/US2015/032893 issued Nov. 13, 2015, 14 pages.
International Searching Authority, Search Report and Written Opinion issued in International Application No. PCT/US2015/040113 issued Feb. 4, 2016, 13 pages.
International Searching Authority, Search Report and Written Opinion issued in International Application No. PCT/US2015/051439 issued Dec. 28, 2015, 7 pages.
International Searching Authority, Invitation to Pay Additional Search Fees and, Where Applicable, Protest Fee, and Communication Relating to the Results of the Partial International Search, issued in International Application No. PCT/US2015/032843 mailed Aug. 18, 2015, 2 pages.
International Searching Authority, Invitation to Pay Additional Search Fees and, Where Applicable, Protest Fee, and Communica-

(56) References Cited

OTHER PUBLICATIONS tion Relating to the Results of the Partial International Search, issued in International Application No. PCT/US2015/040113 mailed Dec. 1, 2015, 2 pages.
International Searching Authority, Invitation to Pay Additional Search Fees and, Where Applicable, Protest Fee, and Communication Relating to the Results of the Partial International Search, issued in International Application No. PCT/US2015/032866 mailed Aug. 31, 2015, 2 pages.
International Searching Authority, Invitation to Pay Additional Search Fees and, Where Applicable, Protest Fee, and Communication Relating to the Results of the Partial International Search, issued in International Application No. PCT/US2015/032893 mailed Aug. 31, 2015, 2 pages.
International Searching Authority, Search Report and Written Opinion issued in International Application No. PCT/US16/18635 mailed May 6, 2016, 12 pages.
International Searching Authority, Search Report and Written Opinion issued in International Application No. PCT/US16/17726 mailed May 12, 2016, 9 pages.
International Bureau, Notification Concerning Transmittal of Copy of International Preliminary Report on Patentability issued in International Application No. PCT/US13/35092 mailed Oct. 16, 2014, 14 pages.
International Searching Authority, Invitation to Pay Additional Fees and, Where Applicable, Protest Fee, and Communication Relating to the Results of the Partial International Search, issued in International Application No. PCT/US13/35092 mailed Aug. 26, 2013, 9 pages.
Fu et al., "Controlled Reagent Transport in Disposable 2D Paper Networks", The Royal Society of Chemistry 2010, Lab Chip, 2010, 10, 918-920.
European Patent Office, Written Opinion of the International Search Authority / International Preliminary Report on Patentability for PCT/US2013/035092 mailed Oct. 16, 2014 (14 pages).
Australian Patent Office, Patent Examination Report No. 1 issued in Australian Application No. 2013243541 on Nov. 25, 2016, 4 pages.
European Patent Office, Partial European Search Report issued in European Application No. 16203346.8-1657 on Mar. 24, 2017, 7 pages.
International Searching Authority, Search Report and Written Opinion issued in International Application No. PCT/US16/59392 mailed Oct. 28, 2016, 13 pages.
International Searching Authority, Search Report and Written Opinion issued in International Application No. PCT/US16/50928 mailed Sep. 9, 2016, 8 pages.
Japanese Patent Office, Office Action issued in Japanese Application No. 2015-504702 issued Jan. 20, 2017, 7 pages (including English language translation).
Stoppa, Matteo, et al., "Wearable Electronics and Smart Tectiles: A Critical Review," Sensors, 2014, pp. 11957-11992, vol. 14 (36 pages).
International Searching Authority, Search Report and Written Opinion issued in International Application No. PCT/US16/43862 mailed Oct. 19, 2016, 14 pages.
International Searching Authority, Search Report and Written Opinion issued in International Application No. PCT/US2017/013453 mailed May 18, 2017, 14 pages.
International Searching Authority, Search Report and Written Opinion issued in International Application No. PCT/US2017/039421 mailed Sep. 6, 2017, 10 pages.
International Searching Authority, Search Report and Written Opinion issued in International Application No. PCT/US2017/040588 mailed Sep. 25, 2017, 11 pages.
Chinese Patent Office, First Office Action issued in Chinese Application No. 201380028053.8 issued Dec. 21, 2105, 4 pages.
Australian Patent Office, Notice of Acceptance for Patent Applicatin issued in Australian Application No. 2013243541 on Mar. 23, 2017 (3 pages).
Chinese Patent Office, Second Office Action issued in Chinese Application No. 201380028053.8 issued Sep. 20, 2016, 8 pages (including English language translation).
Chinese Patent Office, Third Office Action issued in Chinese Application No. 201380028053.8 issued Mar. 20, 2017, 17 pages (including English language translation).
European Patent Office, Supplemental European Search Report issued in European Application No. 15799514.3-1657 on Dec. 7, 2017, 8 pages.
European Patent Office, Supplemental European Search Report issued in European Application No. 15799317.1-1657 on Dec. 21, 2017, 9 pages.
European Patent Office, Partial European Search Report issued in European Application No. 15800043.0-115 on Jan. 8, 2018, 13 pages.
International Searching Authority, Search Report and Written Opinion issued in International Application No. PCT/US2017/047574 issued Nov. 16, 2017, 14 pages.
International Searching Authority, Search Report and Written Opinion issued in International Application No. PCT/US2017/052651 issued Dec. 12, 2017, 14 pages.
Pike, Douglas J., et al., "Flow Cell Design for Effective Biosensing," Sensors, ISSN 1424-8220, Dec. 2012, vol. 13, pp. 58-70, www.mdpi.com/journal/sensors, 13 pages.
Sonner, Z., et al., "The microfluidics of the eccrine sweat gland, including biomarker partitioning, transport, and biosensing implications,"Biomicrofluidics, vol. 9, pp. 031301-1-031301-19, CrossMark, 19 pages.
International Searching Authority, Search Report and Written Openin in International Application No. PCT JS2016/043862, mailed Oct. 19, 2016 (14 pages).
European Patent Office, Official Communication for EP Application No. 13 718 933.8-1101 mailed Feb. 14, 2018 (5 pages).
European Patent Office, Extended European Search Report issued in European Application No. 15819306.0-1115 on Feb. 9, 2018 (9 pages).
International Searching Authority, Search Report and Written Opinion issued in International Application No. PCT/US2017/067495 mailed Mar. 1, 2018, 10 pages.
European Patent Office, Extended Search Report issued in European Application No. 15844313.5 mailed on Mar. 15, 2018, 15 pages.
De Jong, J. et al., "Membranes and microfluidics: a review," Lab Chip, 2006, 6, 1125-1139 (15 pages).
Yamazaki, T. et al., "Smart Integrated Sensor for Multiple Detections of Glucose and L-Lactate Using On-Chip Electrochemical System," Journal of Sensors, vol. 2011, Article ID 190284, doi:10.1155/2011/190284, Accepted Apr. 26, 2011, 7 pages.

\* cited by examiner

SWEAT SENSING DEVICES WITH ELECTROMAGNETICALLY SHIELDED SENSORS, INTERCONNECTS, AND ELECTRONICS

CROSS-REFERENCE TO RELATED APPLICATIONS

This application is a national stage application under 35 U.S.C. § 371 of International Application No. PCT/US2016/059392, filed on Oct. 28, 2016, which claims priority to U.S. Provisional Application No. 62/248,356 filed Oct. 30, 2015, the disclosures of which are hereby incorporated by reference herein in their entireties.

CROSS-RELATED APPLICATION

The present application claims priority to U.S. Provisional Application No. 62/248,356 filed Oct. 30, 2015, the disclosure of which is hereby incorporated herein by reference in its entirety.

BACKGROUND OF THE INVENTION

Sweat sensing technologies have enormous potential for applications ranging from athletics, to neonatology, to pharmacological monitoring, to personal digital health, to name a few applications. Sweat contains many of the same biomarkers, chemicals, or solutes that are carried in blood and can provide significant information enabling one to diagnose illness, health status, exposure to toxins, performance, and other physiological attributes even in advance of any physical sign. Furthermore, sweat itself, the action of sweating, and other parameters, attributes, solutes, or features on, near, or beneath the skin can be measured to further reveal physiological information.

If sweat has such significant potential as a sensing paradigm, then why has it not emerged beyond decades-old usage in infant chloride assays for Cystic Fibrosis or in illicit drug monitoring patches? The majority of conventional applications utilize the crude, slow, and inconvenient process of sweat stimulation, collection of a sample, transport of the sample to a lab, and then analysis of the sample by a bench-top machine and a trained expert. This process is so labor intensive, complicated, and costly that in most cases, one would just as well implement a blood draw since it is the gold standard for most forms of high performance biomarker sensing. Hence, sweat sensing has not emerged into its fullest opportunity and capability for biosensing, especially for continuous or repeated biosensing or monitoring. Furthermore, attempts at using sweat to sense "holy grails" such as glucose have not yet succeeded to produce viable commercial products, reducing the publically perceived capability and opportunity space for sweat sensing.

Of all the other major physiological fluids used for bio monitoring (e.g. blood, urine, saliva), sweat has arguably the smallest sample volumes and, for many applications, has the greatest value when sensing technology is brought onto the body (i.e., instead if a portable hand-held device, or bench-top type test). Smaller sample volumes often mean smaller electrochemical sensors as to not deplete the analyte of interest.

Wearing a sensing device often means that the sampled fluid and sensors are exposed to significant electromagnetic interference. In some cases, sensors themselves have very high impedance, and making them smaller can increase the challenge of electromagnetic interference. Interference can arise from muscle tremors, body movement, loss or change in electrical contact, change in contact area and charges which accumulate at surfaces, change in contact potentials, movement across the skin surface, and numerous other factors. For biofluid type sensors, sweat sensing has a larger challenge set to be resolved than conventional biofluid and microfluidic sensors and sensing systems/devices.

SUMMARY OF THE INVENTION

Many of the drawbacks and limitations stated above can be resolved by creating novel and advanced interplays of chemicals, materials, sensors, electronics, microfluidics, algorithms, computing, software, systems, and other features or designs, in a manner that affordably, effectively, conveniently, intelligently, or reliably brings sweat sensing technology into intimate proximity with sweat as it is generated. With such an invention, sweat sensing could become a compelling new paradigm as a biosensing platform.

Embodiments of the disclosed invention provide a sweat sensor device capable of eliminating or reducing electromagnetic and other types of electronic interference with the sensors in a sweat sensor device. In one embodiment, a sweat sensor device includes sensors that are shielded from interference from outside the body and interference that originates from within or through the body, or through changing contact with the body. In another embodiment, additional electronic filtering is provided, because, for example, in some cases fluidic contact between sensors and the body provides an electrical path through the salty sweat solution path between body and sensors, which could cause interference. In another embodiment, fluid contact with the sensors is kept constant and electrically kept at equipotential between one or more sensors. Importantly, many of these solutions can be implemented in a manner that preserves other advantages of sweat sensing, such as reduced sweat volume, protection of sensors against abrasion, and faster sampling intervals.

BRIEF DESCRIPTION OF THE DRAWINGS

The objects and advantages of the disclosed invention will be further appreciated in light of the following detailed descriptions and drawings in which.

DEFINITIONS

Figure 1:
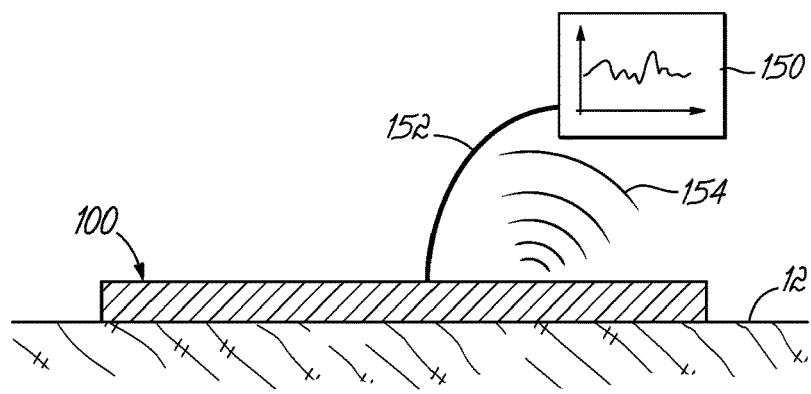
FIG. 1 is a cross-sectional view of a portion of a prior art wearable device for sweat biosensing.

As used herein, "sweat" refers to a biofluid that is primarily sweat, but may also include mixtures of biofluids such as sweat and blood, or sweat and interstitial fluid, so long as advective transport of mixtures of biofluids (e.g., flow) is driven mainly by sweat. The sweat may be, for example, eccrine or apocrine sweat.

As used herein, "microfluidic components" may be comprised of channels in a polymer, textile, paper, or other component known in the art for guiding movement of a fluid or at least partial containment of a fluid.

As used herein, "sweat volume" is the fluidic volume in a space that can be defined multiple ways. Sweat volume may be the volume that exists between a sensor and the point of generation of sweat or a solute moving into or out of sweat from the body or from other sources. Sweat volume can include the volume that can be occupied by sweat between: the sampling site on the skin and a sensor on the skin where the sensor has no intervening layers, materials, or components between it and the skin; or the sampling site on the skin and a sensor on the skin where there are one or more layers, materials, or components between the sensor and the sampling site on the skin.

As used herein, "state void of sweat" is where a space or material or surface that can be wetted, filled, or partially filled by sweat is in a state where it is entirely or substantially (e.g., greater than 50%) dry or void of sweat.

As used herein, "volume reducing component" means any component that is designed or implemented to reduce the sweat volume. In some cases, the volume reducing component is more than just a volume reducing material, because a volume reducing material by itself may not allow proper device function. For example, the volume reducing material may need to be isolated from a sensor that the volume reducing material could damage or degrade, and therefore the volume reducing component may comprise the volume reducing material and at least one additional material or layer to isolate the volume reducing material from said sensors. Volume reducing components may include other components such as electromagnetic shielding components.

As used herein, "electromagnetic shield", "electromagnetic shielding component", or "shielding component" means any component, material, or design that reduces electromagnetic, optical, magnetic, or electronic interference. In some cases, the electromagnetic shielding component is more than just a material. Electromagnetic shielding components may include other components such as sensors or volume reducing components.

As used herein, the term "analyte-specific sensor" or "sensor specific to an analyte" is a sensor specific to an analyte and performs specific chemical recognition of the analyte's presence or concentration (e.g., ion-selective electrodes, enzymatic sensors, electrically based aptamer sensors, etc.). For example, sensors that sense impedance or conductance of a fluid, such as biofluid, are excluded from the definition of "analyte-specific sensor" because sensing impedance or conductance merges measurements of all ions in biofluid (i.e., the sensor is not chemically selective; it provides an indirect measurement). Sensors could also be optical, mechanical, or use other physical/chemical methods which are specific to a single analyte. Further, multiple sensors can each be specific to one of multiple analytes.

As used herein, the term "sensor component" means the components needed for implementation of a sensor specific to an analyte in sweat. For example, a sensor component may include the sensor, one or more electrical connections or wires to the sensor, analog electronics that are electrically connected to the sensor, or other components whose primary purpose in a device is to support operation of the sensor. Electromagnetic shielding may shield at least a portion of a sensor component which includes at least one sensor specific to an analyte in sweat.

DETAILED DESCRIPTION OF THE INVENTION

Embodiments of the disclosed invention applies at least to any type of sweat sensor device that measures sweat, sweat generation rate, sweat chronological assurance, its solutes, solutes that transfer into sweat from skin, a property of or things on the surface of skin, or properties or things beneath the skin. The disclosed invention applies to sweat sensing devices that can take on forms including patches, bands, straps, portions of clothing, wearables, or any suitable mechanism that reliably brings sweat stimulating, sweat collecting, and/or sweat sensing technology into intimate proximity with sweat as it is generated. Some embodiments of the disclosed invention utilize adhesives to hold the device near the skin, but devices could also be held by other mechanisms that hold the device secure against the skin, such as a strap or embedding in a helmet.

Sweat stimulation, or sweat activation, can be achieved by known methods. For example, sweat stimulation can be achieved by simple thermal stimulation, chemical heating pad, infrared light, by orally administering a drug, by intradermal injection of drugs such as methylcholine or pilocarpine, and by dermal introduction of such drugs using iontophoresis. A device for iontophoresis may, for example, provide direct current and use large lead electrodes lined with porous material, where the positive pole is dampened with 2% pilocarpine hydrochloride and the negative one with 0.9% NaCl solution. Sweat can also be controlled or created by asking the subject using the patch to enact or increase activities or conditions that cause them to sweat. These techniques may be referred to as active control of sweat generation rate.

Certain embodiments of the disclosed invention show sensors as simple individual elements. It is understood that many sensors require two or more electrodes, reference electrodes, or additional supporting technology or features that are not captured in the description herein. Sensors are preferably electrical in nature, but may also include optical, chemical, mechanical, or other known biosensing mechanisms. Sensors can be in duplicate, triplicate, or more, to provide improved data and readings. Sensors may be referred to by what the sensor is sensing, for example: a sweat sensor; an impedance sensor; a sweat volume sensor; a sweat generation rate sensor; and a solute generation rate sensor. In an embodiment where only one sensor is illustrated or described, that sensor may comprise multiple sub-sensors and/or may also represent the location of a plurality of sensors specific to analytes in sweat. Certain embodiments of the disclosed invention show sub-components of what would be sweat sensing devices with more sub-components needed for use of the device in various applications, which are obvious (such as a battery), and for purpose of brevity and focus on inventive aspects are not explicitly shown in the diagrams or described in the embodiments of the disclosed invention. As a further example, many embodiments of the disclosed invention could benefit from mechanical or other means known to those skilled in wearable devices, patches, bandages, and other technologies or materials affixed to skin, to keep the devices or sub-components of the skin firmly affixed to skin or with pressure favoring constant contact with skin or conformal contact with even ridges or grooves in skin, and are included within the scope of the disclosed invention. The present application has a specification that builds upon PCT Application No. PCT/US2013/35092, the disclosure of which is hereby incorporated herein by reference in its entirety.

With reference to FIG. 1, a prior art sweat sensor device 100 is placed on or near skin 12. In an alternate embodiment, the sweat sensor device may be simply fluidically connected to skin or regions near skin through microfluidics or other suitable techniques. The device 100 is in wired communication 152 or wireless communication 154 with a reader device 150. In one embodiment of the disclosed invention, the reader device 150 would be a smart phone or portable electronic device. In alternate embodiments, the device 100 and the reader device 150 can be combined. In further alternate embodiments, communication 152 or 154 is not constant and could be a simple one-time data download from the device 100 once it has completed its measurements of sweat.

In an aspect of the present invention, a sweat sensing device includes electromagnetic shielding. An informative example calculation is provided below in Example 1, which shows that in some cases very small sensors (e.g., 1's to 1000's of $\mu m^2$) may be needed, which may then have very high impedance and are therefore more susceptible to electronic or electromagnetic interference ("EMI"). Additionally, certain classes of sensors, such as ion-selective electrodes, can have very high impedance and suffer from EMI. Furthermore, long communication or signal lines between sensors and amplifiers can increase EMI.

Figure 2:
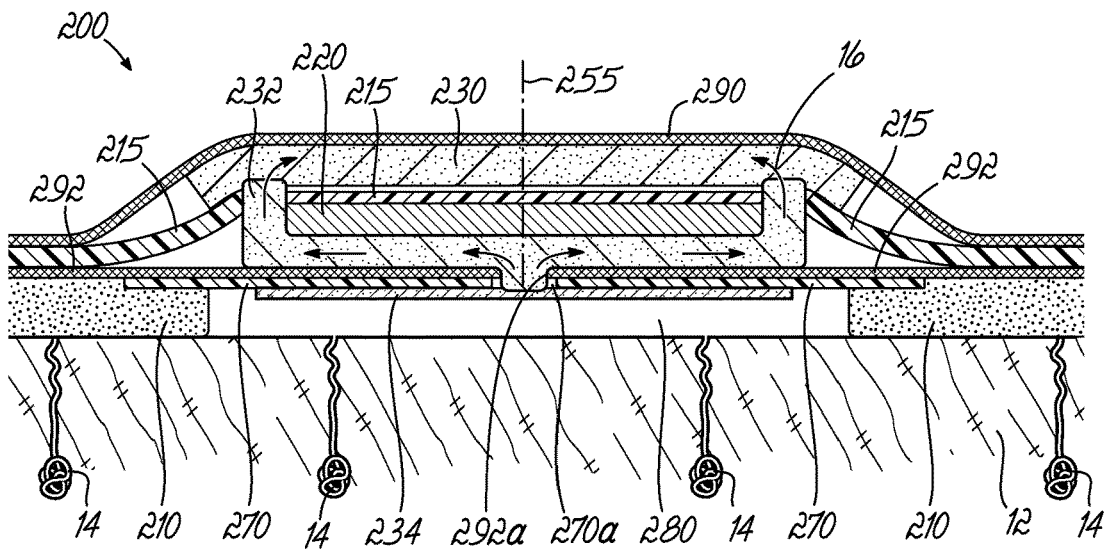
FIG. 2 is a cross-sectional view of a portion of a device for sweat biosensing that is electromagnetically shielded according to an embodiment of the disclosed invention.

With reference to FIG. 2, in an embodiment, a device 200 is configured to provide shielding against EMI. The device 200 includes at least one analyte-specific sensor 220, such as an electrochemical aptamer-based ("EAB") sensor for albumin. The device 200 includes sweat sample management components 230, 232, 234. Although the description herein focuses on sweat, other biofluid samples may be sensed by the device 200. A sample collector 234 moves sweat off the surface of the skin 12. The sample coupler 232 transports sweat across the sensor 220. The sample pump 230 moves excess or old sweat from the sample coupler 232. The sample pump 230 may be designed to store 10's to 100's of $\mu L$ of old sweat, allowing for continuous use for greater than 30 hours at 0.5 nL/min/gland (see Table 1 for related data). The sweat sample management components 230, 232, 234 may be, for example, a textile; stacks of hydrophilic membrane filters; hydrophilic beads (e.g., commercial monodisperse Reade Silica powder); a longer-chain length hydrogel; or a porous polymer; nano-cellulose; microfluidic channels, among other suitable materials.

The device 200 is adhered to the skin 12 by an adhesive 210. The device 200 further includes an outer electromagnetic shield 290 and an inner electromagnetic shield 292. The outer EMI shield 290 is configured to protect the sensor 220 against EMI coming from outside the body. External EMI includes, for example, analog and digital television transmissions; AM, FM, and satellite radio; solar magnetic storms (which peak on an eleven year cycle); lightning (a very high voltage and high current event); utility power grid transmission lines, (having high voltage, low current, and low frequency characteristics), broadband over power lines; digital signals; airport radar; telecom transmissions; electrostatic discharge; white noise; earth's magnetic field flux (which has a value of about 500 milligauss); switching-mode power supplies; arc welders; motor bushes; electrical contacts; and even high-powered electromagnetic pulse threats (intended to disable electrical and electronic equipment). The inner EMI shield 292 is configured to protect the sensor 220 against external EMI propagating through the body or EMI coming from within the body, which includes, for example: muscle tremors; body movement; loss or change in electrical contact; change in contact area and charges that accumulate at surfaces; change in contact potentials; movement across the skin surface; and numerous other types of biological or physical sources. In the embodiment shown in FIG. 2, the inner EMI shield 292 has at least one aperture 292a. The aperture 292a is wide enough to allow an adequate flow of sweat from the skin 12 to the sensor 220 but narrow enough (e.g., on the order of $\mu m$'s or mm's) to block or reduce at least some types electromagnetic wavelengths or sources for EMI. The size of the aperture 292a is configured to ensure EMI exposure is minimized to the sensors, its signal lines, or related electronics. Although the device 200 is illustrated having two EMI shields 290, 292, a device may include one of an external shield or an internal shield without including one of each depending on the sensor used and the intended application. While the illustrated embodiment shows the aperture 292a, other configurations may be used to provide an aperture for sweat transport to the sensor and that are able to reduce EMI.

Regarding dimensions for the apertures in an EMI shield (e.g., inner EMI shield 292), the apertures may be less than a tenth of the electromagnetic wavelength or less than a twentieth of the wavelength, for example. The wavelength of an EM wave is calculated from the following equation: (wavelength)·(frequency)=c, where c is the speed of light in meters/s. In one embodiment where protection is desired against the highest cellular frequency (i.e., about 2.4 GHz with a wavelength of about 125 mm), the width of the aperture 292a may be at least less than about 6.25 mm (¼ inch), which is ¹⁄₂₀th of the wavelength. In an embodiment where the sensor (e.g., sensor 220) is smaller than 6.25 mm, even smaller apertures may be needed to protect the sensor from EMI. Other arrangements are possible, so long as adequate shielding is provided and such that sweat is still able to reach the sensor 220. For example, the sensor 220 may be placed suitably away from the shield. In one embodiment, the inner EMI shield 292 could be a solid metal with a 50 $\mu m$ wide aperture 292a for sweat flow, and the sensor 220 may be placed 50 $\mu m$ away from the aperture (horizontally) such that fewer or none of the EM waves that pass through the aperture 292a would reach the sensor 220. In another embodiment, the sensor 220 could be a ring or donut shaped sensor in which the center hole is aligned over the aperture 292a.

Materials for use in the EMI shields 290, 292 include, without limitation, metal films, such as aluminum or copper films, metal meshes, magnetic shielding including advanced metal alloys, composites containing electrically conductive particles, metal-coated track-etch membranes, conductive polymers, or any other suitable material known by those skilled in the art. In one embodiment, the EMI shields 290, 292 could be copper films on flexible polyimide substrates, and the sensor 220 may be fabricated on the same substrate and folded over to align with an aperture for sweat flow through the copper film and the substrate to the sensor 220. In one embodiment, the outer EMI shield 290 could be breathable (e.g., a textile or medical bandage cover material) and could be vacuum-coated with an aluminum or other metal coating having a thickness of 1's to 100's of nm or more. In an embodiment, one or both of the EMI shields 290, 292 may be coated with an electrical insulator to allow proper insulation against some frequencies of EMI, to prevent DC shorting or corrosion, and to prevent a sweat electrical contact between the skin 12 and the EMI shields 290, 292. The electrical insulator may be, for example, Parylene or anodized aluminum.

Still referring to FIG. 2, in one embodiment, the device 200 is configured to provide a centered sweat flow across the sensor 220. The device 200 includes sweat impermeable materials 215, 270. The sweat impermeable materials 215, 270 may be made of, for example, Kapton, PET plastic, or other suitable materials. The sweat impermeable material 215 may also serve as a substrate for fabrication. In one embodiment, one or more components shown in FIG. 2 are fabricated on the sweat impermeable material 215. The sweat impermeable material 270 has an aperture 270a to allow sweat to flow from the skin 12 to the sensor 220. In the illustrated embodiment, the apertures 270a and 292a are located at the center of the sensor 220, which is marked by axis 255. Having the sweat flow centered on the sensor 220 may improve the sweat sampling rate for a given sweat generation rate. For example, in an embodiment where sensor 220 is a circular sensor, a centered sweat flow may provide a sampling rate as much as about 2 times faster than a non-centered flow. The sample collector 234 is positioned adjacent to the skin-facing surface of the sweat impermeable material 270.

Figure 3:
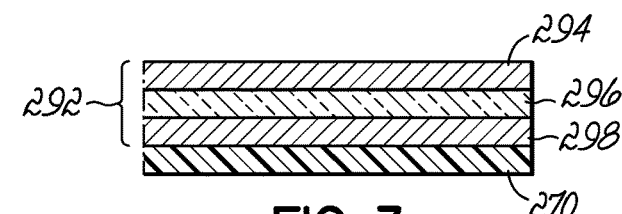
FIG. 3 is a cross-sectional view of an inner shield and a sweat impermeable material of the device of FIG. 2.

With reference to FIG. 3, in one embodiment, the sweat impermeable material 270 may be a polymer film and the inner EMI shield 292 may be an EMI shield material coated on the polymer film 270. The inner EMI shield 292 may include at least two layers of metal 294, 298 separated by a layer of insulator 296. For example, the inner EMI shield 292 could be in part comprised of Al/anodized-Al or Al/Parylene coated onto the polymer film 270. The polymer film 270 coated with the inner EMI shield 292 would therefore block moderate to high-frequency EMI. The outermost coating of metal 294 may be in contact with sweat and would provide electrical contact to sweat in order to reduce low frequency or DC EMI (e.g., EMI due to changing contact potentials and charge as the device 200 moves or flexes on the skin 12). For example, in one embodiment, the sensor 220 could be comprised of one or more sensors and a reference electrode that all are wetted by sweat which is held at a fixed electrical potential relative to sensors and the reference electrode. Therefore, in an embodiment, the electrically conductive material 294 is electrically conductive with sweat that is adjacent to the analyte-specific sensor 220. The electrically conductive material 294 and the analyte-specific sensor 220 may be connected electrically to the same electronics in the device 200. Furthermore, all sensors or reference electrodes of the sensor 220 would remain wetted by sweat by virtue of the wicking strength of the sample coupler 232, further reducing or eliminating EMI due to contact potentials or surface charges such as zeta potentials.

There are several design considerations that may impact use of electromagnetic shielding. For example, in some sweat sensing applications, it is desired to reduce the required sweat volume and increase the sweat sampling rate. Therefore, in one aspect of the disclosed invention, it may be desirable to add electromagnetic shielding without overly increasing the required sweat volume. To that end, electromagnetic shielding may be integrated with volume-reducing components in a manner that does not eliminate or overly reduce the benefits of the volume-reducing components. Referring again to FIG. 2, the device 200 further includes a volume-reducing component comprised of a sample collector 234 in fluidic contact with the sample pump 230. The sample collector 234 is configured to reduce the sweat volume of the wicking space 280 between the sample collector 234 and the surface of the skin 12. In other words, the thickness of the sample collector 234 is less than the height of the wicking space 280. Otherwise, adding a sample collector 234 would primarily increase the sweat volume, which would be undesirable because this would tend to increase the sweat sampling interval. An exception would be in cases where sensors and devices are very loosely applied to skin, but in those cases the sweat volume is already impractically large. Textiles, paper or other common wicking materials are generally too large to be used as the sample collector 234, since they are typically more than 100 µm thick, although textiles and similar materials may be suitable for use as a sample collector 234. In an embodiment where the wicking space 280 has an average height of 50 µm due to skin roughness, or greater if hair or debris is present, the sample collector 234 could be a 5 µm thick layer of screen printed nano-cellulose with a weak hydrophilic binder material to hold the cellulose together so it does not fall apart. In this configuration, the sweat volume would be reduced by about 10% compared to the case of having no sample collector 234.

In accordance with the principles of the disclosed invention, the relative capillary properties of the sweat sample management components 230, 232, 234 and the wicking space 280 may vary. In one embodiment, the sample coupler 232 has the greatest capillary force relative to the other the sweat sample management components (i.e., components 230, 234), so that the sensor 220 remains wetted with sweat. The sample collector 234 and the sample coupler 232 would have greater capillary force than the wicking space 280. To that end, each of the sweat sample management components 230, 232, 234 and the wicking space 280 has a wicking pressure (also called capillary force) associated with it—P1, P2, P3, and P4, respectively. The sample collector 234 is configured to have a stronger wicking pressure than the wicking space 280 between the skin 12 and the sample collector 234. In other words, the sweat may be drawn from the sweat glands 14 to the sample collector 234 without completely filling the wicking space 280. In the presence of sweat, the sample coupler 232 will tend to become saturated, at which point it could fail to provide a reduced sweat volume because its capillary force would approach zero. Therefore, the sample pump 230 is configured to wick sweat from sample coupler 232 to prevent the saturation of the sample collector 234 and has a greater capillary force than wicking space 280. The wicking pressure P2 of the sample coupler 232 is greater than that of the sample collector 234, such any sweat that the sample collector 234 receives, will then be rapidly absorbed by the sample coupler 232 and wet the sensor 220. Lastly, the sample pump 230 has a pressure P1 that is greater than P3 and less than P2, such that if the sample coupler 232 becomes full, the sample pump 230 will pull additional sweat for disposal (indicated by the arrow path 16 in FIG. 2). Importantly, by setting up the relationship P4<P3<P1<P2, the sample coupler 232 has the greatest wicking pressure such that the sensor 220 will always be wetted with the most recent sweat sample. In another embodiment, the sample pump 230, and the sample coupler 232 have the same capillary force. In a further embodiment, the sample pump 230, and the sample coupler 232 are made of the same material.

Suitable materials for the sweat sample management components 230, 232, 234 include, without limitation, nano-cellulose, hydrogels, and woven or non-woven polyamide or microfluidic components. Nano-cellulose forms a gel-like material that remains cohesive even when hydrated due to microfibril interactions (no binder needed). Nano-cellulose is soft and should promote wetting by the sensor 220. Another attractive possibility is to coat and polymerize a thin film of a hydrogel or superporous hydrogel. Hydrogels, when hydrated, can exhibit pore sizes more than adequate for advective transport of proteins. Superporous hydrogels have a physically open porous network that can be tuned from sizes of 100's of nm to several μm's. Hydrogels are inherently soft when wet and, with slight pressure, will remain in wetted contact with the sensors and can be coated onto either the polyamide collector, or even onto sensors, or with compatible curing chemistry used to adhere the two components together. Polyamide (nylon) is easily microreplicatable, hydrophilic, and has lower non-specific binding of proteins compared to many other polymers. Materials capable of providing adequate capillary force include, without limitation, microfluidic channels or cavities, hydrogels, superporous hydrogels or polymers, textiles, beads or powders, sponges, fiber mats, salts or desiccants, or other suitable materials. The capillary force properties of the material used for the sample coupler 232 may be manipulated to have a desired level through, for example, control of the internal capillary geometry or of the surface energy. Other methods and materials to form a robust wicking layer may also be used in the disclosed invention. Embodiments of the disclosed invention may include additional sweat volume reduction features, including for example those taught in PCT/US15/32893, Devices with Reduced Sweat Volumes between Sensors and Sweat Glands, the disclosure of which is hereby incorporated herein by reference in its entirety.

Figure 4:
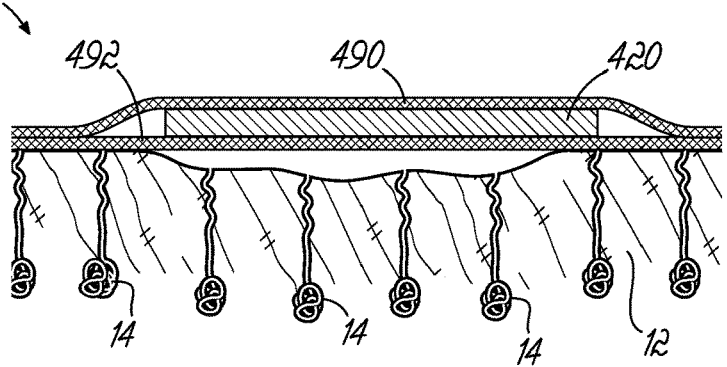
FIG. 4 is a cross-sectional view of a portion of a device for sweat biosensing that is electromagnetically shielded according to an embodiment of the disclosed invention.

With reference to FIG. 4, in an embodiment, where like numerals refer to like features of previous figures, a device 400 functions in a way similar to the device embodiments illustrated in previous figures but additionally is configured to provide shielding against EMI without need for additional microfluidic or wicking components. The device 400 includes a sensor 420 and EMI shields 490, 492. In one embodiment, the shield 492 could be a 25 μm nylon mesh or other suitable mesh, such as commercial non-woven nylon mesh or other mesh sold by Sefar Inc. The nylon mesh shield 492 may be coated on at least one side with metal which provides the EMI shielding effect, and further coated with a hydrogel or hydrophilic treatment to allow sweat to rapidly transverse it. Therefore, in an embodiment, at least one EMI shielding component may be porous to sweat. Further, in an embodiment, at least one EMI shielding component may be at least partially sweat wicking in nature.

Figure 5:
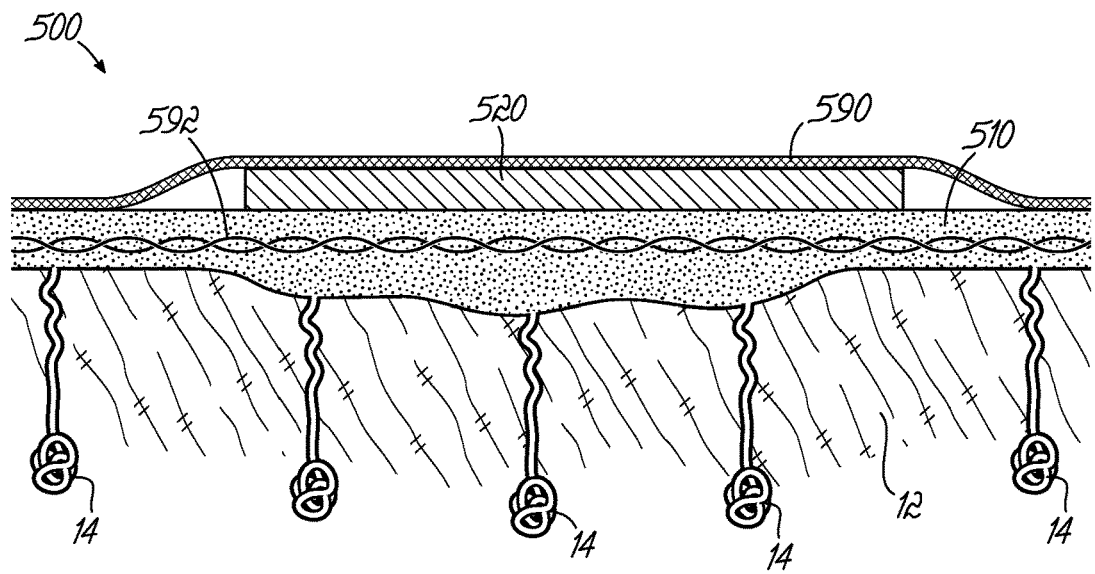
FIG. 5 is a cross-sectional view of a portion of a device for sweat biosensing that is electromagnetically shielded according to an embodiment of the disclosed invention.

With reference to FIG. 5, in an embodiment, where like numerals refer to like features of previous figures, a device 500 includes a sensor 520 and EMI shields 590, 592. The EMI shield 592 is a thin wire mesh or ensemble of electrically conductive fibers (e.g., carbon fibers, silver nanowires, etc.) embedded in an adhesive 510. The adhesive 510 may be a hydrogel adhesive or other form of medical adhesive that is porous to water and at least one analyte to be detected in sweat. The EMI shield 590 could also be porous to sweat or to water vapor (e.g., allowing water to evaporate from within the device 500 or excess sweat to exit the device 500).

Figure 6:
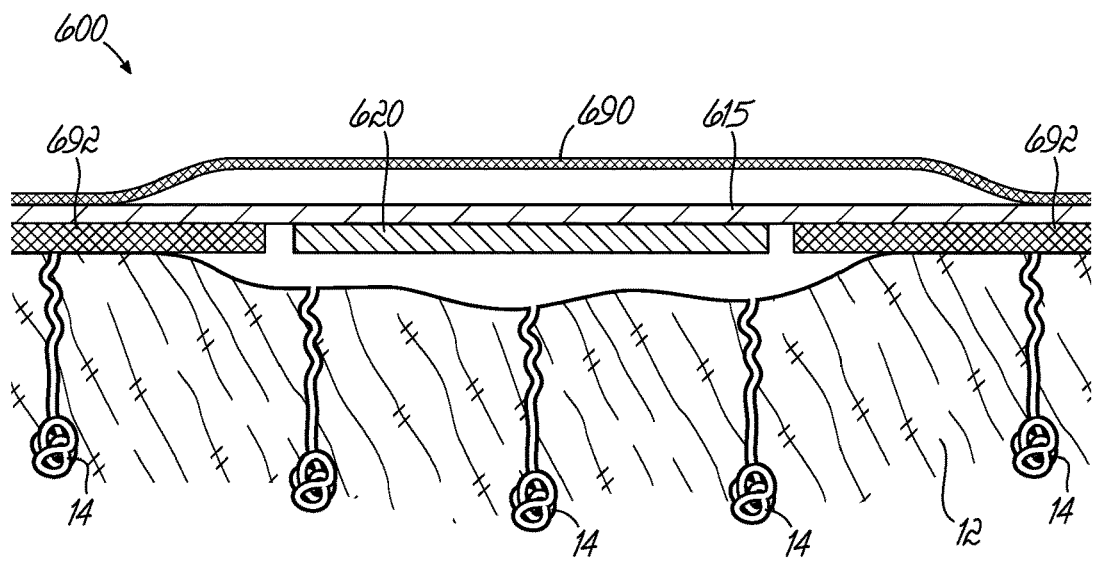
FIG. 6 is a cross-sectional view of a portion of a device for sweat biosensing that is electromagnetically shielded according to an embodiment of the disclosed invention.

With reference to FIG. 6, in an embodiment, where like numerals refer to like features of previous figures, a device 600 includes a substrate 615 that carries a sensor 620 and EMI shields 690, 692. The EMI shield 692 is a co-planar shield, which is different from the EMI shield 592 shown in FIG. 5 that is positioned between the sensor 520 and skin 12. The EMI shield 692 reduces or eliminates EMI coming from or through the body. In one embodiment, a relatively small (10 μm×10 μm) electro-active aptamer type sensor 620 is fabricated on the substrate 615. Because the sensor 620 is so small, it would not have a significant amount of area to receive and pick up EMI. Additionally, in an embodiment, an EMI shield 692 made of a gold film may be fabricated on the substrate 615 and may substantially surround the sensor 620. An electrical connection from the sensor 620 to read-out electronics (not-shown) could connect through the substrate 615 to the backside of the substrate 615. A "co-planar shield" need not be completely co-planar, but should be close enough and geometrically arranged such that it effectively reduces EMI similar to perfectly co-planar arrangements. For example, in an embodiment where the EMI shield 692 is on the opposite side of the substrate 615 compared to that shown in FIG. 6, the EMI shield 692 may be considered a "co-planar" shield. For example, the EMI shield 692 may be positioned on a substrate 615 having a thickness of about 15 μm. Advantageously, EMI shields according to various embodiments not only shield sensors from EMI, but also shield their connecting electrical lines, local analog amplifiers, buffers, or other electronics that may need to be shielded. Therefore, EMI shields may shield at least a portion of a sensor component that includes at least one sensor specific to an analyte in sweat. For example, in one embodiment, the EMI shield 692 could shield electrical lines between the sensor 620 and read-out electronics (not shown).

Figure 7:
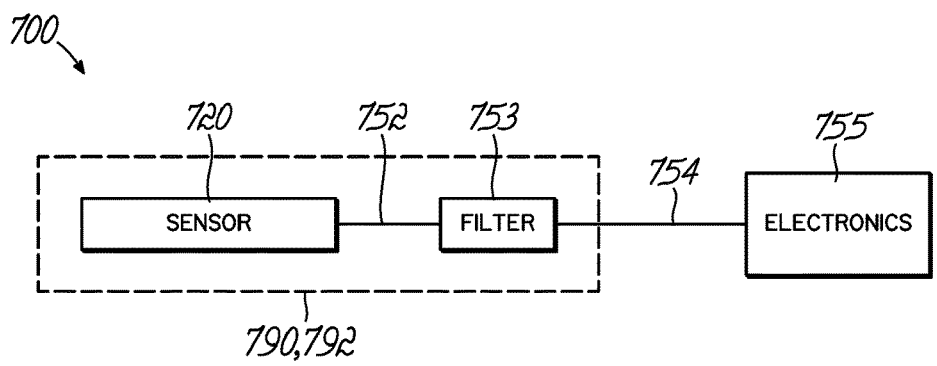
FIG. 7 is a block diagram of electronic filtering according to an embodiment of the disclosed invention to reduce interference signals that are not suitably blocked or attenuated by the electromagnetic shielding.

With reference to FIG. 7, a block diagram representation of a portion of a device 700 is shown. In an embodiment, the device 700 includes a sensor 720, an electronic filter 753, EMI shields 790, 792, and electronics 755. The electronic filter 753 is electrically connected to the sensor 720 and the electronics 755, as shown by connections 752, 754 respectively. In one embodiment, sweat forms a continuous fluidic connection between the skin 12 and the sensor 720. Because sweat is conductive, the continuous fluidic connection could allow low frequency or DC electrical signals to propagate from the skin to the sensor 720. In one embodiment, the sensor 720 could be an impedance based sensor, which is sampled at 100 kHz, and EMI shields 790, 792 block external high frequency EMI of greater than 100 kHz. The high-pass filter or circuit 753 may block low frequency EMI of less than 10 kHz and DC EMI signals. The high-pass filter 753 could be a passive filter or an active filter, which could be unity gain or amplified. In another embodiment, a filter other than a high-pass filter may be used, such as a low-pass filter, a bandpass filter, or notch filter. For example, a low-pass filter may be used with DC voltage type sensors such as ion-selective electrodes. Numerous techniques and arrangements of amplifiers, buffers, and passive or active filters are possible as known by those skilled in the art. If the filter 753 is active, then it strengthens the signal such that read-out electronics, such as a microcontroller or other electronics 755 could be contained outside the shielding 790, 792. Alternately, the EMI shields 790, 792 may shield the electronics 755. For example, in an embodiment, all or most of the electronics 755 of the device 700 could be placed inside the EMI shields 790, 792 except for any component that may not function properly within an EMI shield (e.g., a communication component such as an antenna). This further illustrates that components within embodiments according to the disclosed invention can also be shielded in part from other components of the device itself (e.g., a sensor can be shielded from a noisy antenna contained in the same device). The EMI shields 790, 792 may be electrically insulated or electrically exposed (electrically conductive with skin or sweat). In one embodiment, the EMI shields 790, 792 could be electrically exposed and used to block both DC and high-frequency EMI, and an appropriate band-pass filter 753 may be utilized. Numerous alternate arrangements can be envisioned by those skilled in the art. It should be recognized that components described in various embodiments may be combined with each other. For example, an embodiment may include a filter 753 and sweat sample management components 230, 232, 234.

The following Example 1 is provided to help illustrate the disclosed invention, and is not comprehensive or limiting in any manner.

Example 1

The calculations herein aim to reduce the fluidic volume between eccrine sweat ducts and sensors from 1's of μL down to 10's of nL (10-100×), resulting in chronologically correlated sweat biosensing with about 2 minute maximum resolution. Aspects of the disclosed invention include eliminating greater than 90% of the dead volume adjacent to the skin surface, mitigating surface contamination, and resulting in ultra-efficient transport of sweat across arrays of sub-mm electrochemical biosensors. Ultra-efficient sweat sampling and transport is essential for applications that require minute-level resolution and, even for those applications that do not require minute-level resolution, greatly reduces the burden on the amount of sweating needed to obtain a viable sample. It should be recognized that the calculation below does not consider certain effects such as surface inhomogeneity and sweat contact angle hysteresis.

In all the calculations herein, the wicking pressures P1, P2, P3 all originated from negative Laplace pressure $$\Delta p = \gamma \left( \frac{1}{R_1} + \frac{1}{R_2} \right)$$

where the surface tension ($\gamma$) of sweat is close to that of pure water (i.e., $\gamma$ of about 70 mN/m). In the calculations, the fluid is constant, and the principle radii $R_1$ and $R_2$ are always concave (negative). To simplify the discussion, the effective radii is used for each sub-component so there is no need to quantify wicking pressure (smaller radii=higher pressure).

The Cavity Between the Device and Skin. A rough 2D calculation may be made to determine what is required to reduce the volume of sweat between a sweat collector (e.g., sample collector 234) and the skin to 10% of the total available volume.

Assuming a 60 μm peak-to-valley skin roughness, at 10% volume, the sweat will be wicked into a space that extends only 20 μm out from the skin peaks, with a meniscus between skin and the sweat collector that spans about 20 μm. Assuming the most difficult scenario of a sweat contact angle on skin of $\theta_{skin}=0°$ (hydrated and swollen; more typical contact angles are around 90°). Assume the sweat collector is made of polyamide (e.g., nylon, PA46) with an average contact angle of $\theta_{poly}=45°$. The wicking pressure for a long groove in the skin will be dominated by a single radius of curvature ($R_{skin}$), which can be visualized along the meniscus edge, and calculated using Equation 1 below:

$$R_{skin} = -h/(\cos[\theta_{poly}-45°]+\cos\theta_{skin}) \cong 10 \text{ μm}$$

where h is about 20 μm as previously discussed and the −45° term is because the capillary is converging. Using the $R_{skin}$ of about 10 μm, the capillary force which the collector needs to sustain may be calculated.

Wicking Pressure of the Sample Collector. Returning attention to the wicking pressure (P3) of the sample collector (e.g., sample collector 234), for simplicity assume 1:1 aspect ratio square microchannels of width w, for which an effective single capillary radius $R_{coll}$ can be calculated as $R_{coll}=w/(3\cos(\theta_{poly})-1)$. In the example calculations above, the wicking pressure of the collector P3 must sustain the less than 10% sweat volume against skin. Therefore, a value of $R_{coll}=R_{skin}=10$ 1nn leads to the calculation of w of about 12 μm. Such channels may be fabricated in polyamide using, for example, roll-to-roll processing.

Wicking Pressure of the Sample Coupler. Next, comes consideration of the 10's of μm thick coupler (e.g., the sample coupler 232) with wicking pressure P2, which at all times preferably keep the sensors (e.g., sensor 220) wetted with the most recent sample of sweat. To achieve this, assume at least a 10× decrease in effective capillary radius or $R_{wick}$ of about 1 μm (more than what is needed to tolerate possible variances). There are numerous methods to fabricate a sample coupler with such smaller capillary radius. For example, a coating of nano-cellulose or hydrogel that is 20 μm thick when hydrated, such as a screen or gravure printing down to μm's of thickness, may be used.

Wicking Pressure of the Sample Pump. The sample pump (e.g., the sample pump 230) acts to continue to collect and dispose of excess sweat. The wicking pressure of the sample pump (P1) must be greater than the sample collector (P3) but must not exceed the wicking pressure of the sample coupler (P2) else it will remove sweat from the sample coupler and leave inadequate sample volume for sensing. An effective wicking radius of $R_{pump}=2$ to 3 μm may be created using, for example, stacks of hydrophilic membrane filters with well-tuned pore sizes; fairly homogeneous beads (e.g. commercial monodisperse Reade Silica powder); a longer-chain length hydrogel; among others. Again, the coupler (P2) effective $R_{wick}$ may be decreased to 10's or 100's of nM to allow a wider selection of materials and effective radius $R_{pump}$ for the sample pump (P1). Note, the 10% volume between the skin and the sample collector is actually further reduced by the sample pump because the wicking space (e.g., the wicking space 280) is ultimately competing with the sample pump (P1) and not just the sample collector (P3).

Expected Sampling Intervals. Using the design of the device 200, the expected sampling rates are provided in Table 1, assuming: the sample collector 234 has a 3 mm diameter; the device 200 covers the abdomen or forearm with 150 glands/cm² and only two thirds of the glands active; the channels of the sample collector 234 conservatively comprising as much as 20% of the surface area; and the sample coupler 232 is 15 μm thick and 60% porous covered by sensor(s) 220 that fit within a space having a diameter of 1.6 mm (i.e., the sensor diameter is 1.6 mm).

TABLE 1

| nL/min/gland | Collector (14.1 nL) | Via (2 nL) | Coupler & Sensor (1.4 nL) |
| --- | --- | --- | --- |
| 0.05 | 40.0 minutes | 5.7 | 4.0 |
| 0.1 | 20.0 | 2.8 | 2.0 |
| 0.2 | 10.0 | 1.4 | 1.0 |
| 0.5 | 4.0 | 0.6 | 0.4 |
| 1 | 2.0 | 0.3 | 0.2 |
| 2 | 1.0 | 0.1 | 0.1 |

As can be seen in Table 1, the sample collector 234 clearly causes the biggest delays. This is also a worst case calculation, because it assumes the sample collector 234 is saturated with fluid, which is improbable during typical use since P2>P3. Furthermore, it can be seen that the sample coupler 232 and sensor 220 can be enlarged substantially before it would become a bottleneck. These elements in Table 1 are in series, so their effect on sampling interval is not additive (just causing a time lag, not a time broadening).

Interplay of Sample Volumes and Sensors and Electronics. Some applications may create very small sample volumes next to the sensor, which could be an issue for low-concentration biomarkers. For example, consider a 0.1 mm$^2$ sensor with $5 \times 10^{12}$ probes/cm$^2$ (aptamer), which is $5 \times 10^9$ probes or about $8 \times 10^{-15}$ moles of probe. Now, assume for 14.1 nL of solution flows past the sensors (Table 1) and 10 nM of cortisol as an example. That is $14.1^{-9}$ L*10 nM/L=$1.41 \times 10^{-16}$ moles of cortisol. The available analytes are 60× less than available probes, and the sensor surface area must be minimized. This reduces the sensor signal and can increase the effects of EMI. Of course, probe occupation is much more complex and in some cases non-linear, but this illustrates that low-concentration markers leads to the use of one of, or a combination of: (1) higher sweat rates; (2) smaller sensors; (3) or larger collector diameters to collect more sweat; and (4) EMI shielding to combat decreased signal to noise ratio as sensors are miniaturized. Existing sensor amplifiers can easily read 10's of GΩ's sensors (50 pA at 0.5V). Because noise may be an issue, metal films for EMI shielding are incorporated. This shows an initially unexpected, but very significant benefit of the design of the device 200, as the sensors and line-outs are completely electromagnetically shielded. This could not be achieved with sensors directly against skin.

While specific embodiments have been described in considerable detail to illustrate the present invention, the description is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A sweat sensing device configured to be placed on a wearer's skin, comprising:
   an analyte sensor for measuring a target analyte in a sweat sample;
   one or more volume-reducing components that provide a volume-reduced pathway for the sweat sample between the analyte sensor and sweat glands when the device is positioned on the wearer's skin, wherein the analyte sensor has a sampling interval when sensing analytes in the sweat sample and the volume-reduced pathway decreases the sampling interval of the analyte sensor; and
   at least one electromagnetic shield integrated with the one or more volume reducing components, the at least one electromagnetic shield configured to protect at least a portion of the analyte sensor from electromagnetic interference propagating from outside the wearer's body, inside the wearer's body, and through the wearer's body.

2. The device of claim 1, wherein the at least one electromagnetic shield comprises:
   a first electromagnetic shield for protecting said sensor component from electromagnetic interference originating outside the wearer's body; and
   a second electromagnetic shield for protecting said sensor component from electromagnetic interference originating from the wearer's body or propagating through the wearer's body.

3. The device of claim 2, wherein at least one of said first or second electromagnetic shields includes at least one electrically conductive coating.

4. The device of claim 3, wherein said electrically conductive coating includes an electrical insulator coating.

5. The device of claim 2, wherein at least one of said first or second electromagnetic shields includes a plurality of electrically conductive layers separated by at least one electrical insulator coating.

6. The device of claim 2, further comprising:
   a flow of sweat to a sensor; and
   electronics; and
   an electrically conductive material that is electrically conductive with said flow of sweat and said flow of sweat is adjacent to said analyte-specific sensor;
   wherein said electrically conductive material and said sensor are in electrical communication with the electronics.

7. The device of claim 1, further comprising:
   a flow of sweat to a sensor; and
   electronics; and
   an electrically conductive material that is electrically conductive with said flow of sweat and said flow of sweat is adjacent to said analyte-specific sensor;
   wherein said electrically conductive material and said sensor are in electrical communication with the electronics.

8. The device of claim 1, further comprising:
   at least one material promoting wetting of sweat against said at least one analyte-specific sensor.

9. The device of claim 2, wherein at least one of said first or second electromagnetic shields are porous to sweat.

10. The device of claim 2, wherein at least one of said first or second electromagnetic shields are capable of wicking sweat.

11. The device of claim 1, wherein said electromagnetic shield is porous to sweat.

12. The device of claim 1, wherein said electromagnetic shield is capable of wicking sweat.

13. The device of claim 1, further comprising:
   an adhesive for adhering the device to the skin,
   wherein said second electromagnetic shield is embedded in, or adjacent to, the adhesive.

14. The device of claim 1, wherein said electromagnetic shield is porous to water vapor.

15. The device of claim 1, wherein said electromagnetic shield is coplanar to said at least one analyte-specific sensor.

16. The device of claim 1, further comprising:
   at least one electronic filter.

17. The device of claim 16, wherein said electronic filter includes at least one filter selected from the group consisting of: a high-pass filter, a low-pass filter, a band-pass filter, and a notch filter.

18. The device of claim 1, further comprising:
   electronics,
   wherein said electronics are enclosed by said electromagnetic shield.

19. The device of claim 18, further comprising:
   at least one communication component, wherein said communication component is not enclosed by said electromagnetic shield.

* * * * *